(12) United States Patent
Topiwalla et al.

(10) Patent No.: US 12,464,183 B2
(45) Date of Patent: *Nov. 4, 2025

(54) METHODS AND SYSTEMS FOR ACCESSING MEDIA CONTENT FROM MULTIPLE SOURCES

(71) Applicant: DISH Network L.L.C., Englewood, CO (US)

(72) Inventors: Sanjiv Topiwalla, Parker, CO (US); Neil Marten, Lakewood, CO (US); Luke VanDuyn, Conifer, CO (US); Ross Drennan, Monument, CO (US); Caroline Condon, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,875

(22) Filed: Jun. 11, 2024

(65) Prior Publication Data

US 2024/0333995 A1 Oct. 3, 2024

Related U.S. Application Data

(63) Continuation of application No. 18/165,923, filed on Feb. 7, 2023, now Pat. No. 12,022,145, which is a continuation of application No. 17/545,513, filed on Dec. 8, 2021, now Pat. No. 11,582,501.

(51) Int. Cl.
*H04N 21/2665* (2011.01)
*H04N 21/258* (2011.01)
*H04N 21/262* (2011.01)

(52) U.S. Cl.
CPC ... *H04N 21/2665* (2013.01); *H04N 21/25891* (2013.01); *H04N 21/26258* (2013.01)

(58) Field of Classification Search
CPC ......... H04N 21/2665; H04N 21/25891; H04N 21/26258
See application file for complete search history.

(56) References Cited

U.S. PATENT DOCUMENTS

| 11,582,501 | B1 * | 2/2023 | Topiwalla | H04N 21/2665 |
| 12,022,145 | B2 * | 6/2024 | Topiwalla | H04N 21/26258 |
| 2014/0282772 | A1 | 9/2014 | Chen et al. | |
| 2014/0358901 | A1 * | 12/2014 | Kim | H04N 21/2665 707/722 |
| 2018/0101614 | A1 | 4/2018 | Kuipers et al. | |
| 2020/0107077 | A1 * | 4/2020 | Einaudi | G06F 16/735 |
| 2022/0197675 | A1 | 6/2022 | Adler et al. | |

* cited by examiner

*Primary Examiner* — Nnenna N Ekpo
(74) *Attorney, Agent, or Firm* — Perkins Coie LLP

(57) ABSTRACT

The present disclosure is directed to methods and systems for searching for media content across multiple sources. A multi-source content system can connect various media content sources (e.g., internet streaming platforms, local or cloud storage, OTA networks, cable network, satellite network, public library databases, etc.) to a gateway. When a user searches for media content, the gateway can detect the search and perform a query across the various media content sources to locate the media content. The multi-source content system can prioritize the search results according to free content, local storage devices, gateway content services or bandwidth management metrics, and present the search results to the user. The multi-source content system can aggregate multiple media content sources and devices connected to a gateway to retrieve media content.

20 Claims, 7 Drawing Sheets

METHODS AND SYSTEMS FOR ACCESSING MEDIA CONTENT FROM MULTIPLE SOURCES

CROSS-REFERENCE TO RELATED APPLICATIONS

This application is a continuation of U.S. patent application Ser. No. 18/165,923, entitled "METHODS AND SYSTEMS FOR SEARCHING FOR MEDIA CONTENT ACROSS MULTIPLE SOURCES," filed Feb. 7, 2023, which is a continuation of U.S. patent application Ser. No. 17/545,513, entitled "METHODS AND SYSTEMS FOR SEARCHING FOR MEDIA CONTENT ACROSS MULTIPLE SOURCES," filed Dec. 8, 2021, the contents of which are hereby incorporated by reference in its entirety.

BACKGROUND

In some cases, when a user searches for media content in a media source (e.g., Netflix™), they may not find the media content they are looking for. In other cases, when the user searches on the internet for the media content, a web page may not have the most recent information about where to find the media content. Currently, to locate media content, the user must have knowledge of where to search to find the media content.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for searching for media content across multiple sources. A multi-source content system can connect various media content sources (e.g., internet streaming platforms, local or cloud storage, OTA, cable, satellite, etc.) to a gateway. When a user searches for media content, the gateway can detect the search and perform a query across the various media content sources to locate the media content. The multi-source content system can prioritize the search results according to free content, local storage, gateway content services or bandwidth management, and present the search results to the user. In some implementations, when the media content is unavailable, the multi-source content system can query the various media content sources for content that is similar to the requested content based on machine learning techniques using the user's profile or viewing history. For example, if a particular movie is unavailable on any of the content sources, the multi-source content system can select a related movie, such as a movie in the same genre, based on machine learning using the user's viewing history of sporting events.

In existing content systems, the systems can only search in the same type of sources, such as internet streaming services. In the present embodiments, the multi-source content system searches across multiple types of sources, such as streaming services, local and cloud storage, cable, satellite, or OTA, to identify results for the user. For example, the present multi-source content system searches for a requested media content on different content providers (e.g., broadcast, internet, etc.) and user storage sources (e.g., hard drives, digital video recorder (DVR), network attached storage (NAS), etc.). Thus, the present embodiment improves the user search experience by aggregating multiple media content sources and devices that are connected to a gateway to retrieve media content.

Figure 1:
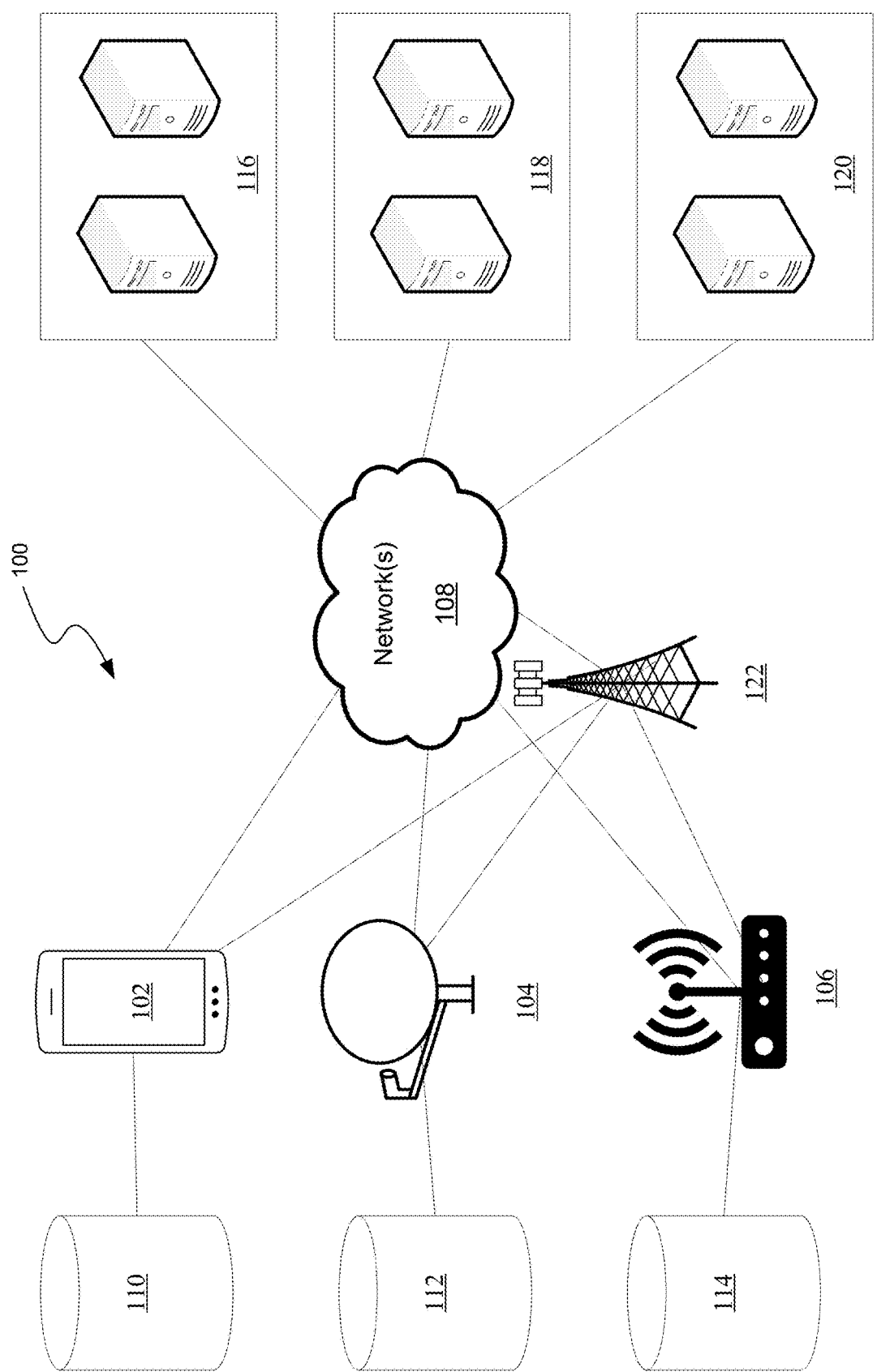
FIG. 1 illustrates an example of a distributed system for searching for media content across multiple sources.

FIG. 1 illustrates an example of a distributed system for searching for media content across multiple sources. Example system 100 presented is a combination of interdependent components that interact to form an integrated whole for searching for media content across multiple sources. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to request, stream, retrieve, and store media content. In one example, a client device 102 may be a mobile phone, a client device 104 may be a smart OTA antenna, and a client device 106 may be a broadcast module box (e.g., set-top box). In other example aspects, client device 106 may be a gateway device that is in communication with multimedia content providers and user storage sources. Other possible client devices include but are not limited to tablets, personal computers, televisions, etc. In aspects, a client device, such as client devices 102, 104, and 106, may have access to one or more data sources and/or databases comprising user requested media content or information describing the user requested media content. In other aspects, client devices 102, 104, and 106, may be equipped to receive live requested content data. The signals that client devices 102, 104, and 106 may receive may be transmitted from satellite broadcast tower 122. Broadcast tower 122 may also be configured to communicate with network(s) 108, in addition to being able to communicate directly with client devices 102, 104, and 106. In some examples, a client device may be a set-top box that is connected to a display device, such as a television (or a television that may have set-top box circuitry built into the television mainframe).

Client devices 102, 104, and 106 may be configured to run software that allows for a user to search for media content in various sources. The media content may be stored locally on the client device or run remotely via network(s) 108. For example, a client device may receive a signal from broadcast tower 122 containing the media content. The signal may indicate the user requested media content. The client device may receive this user requested content data and subsequently store this data locally in databases 110, 112, and/or 114. In alternative scenarios, the user requested content data may be transmitted from a client device (e.g., client device 102, 104, and/or 106) via network(s) 108 to be stored remotely on server(s) 116, 118, and/or 120. A user may subsequently access the media content data from a local database (110, 112, and/or 114) and/or external database (116, 118, and/or 120), depending on where the media content data may be stored. The system may be configured to receive and process user requested content data in the background.

In some example aspects, client devices 102, 104, and/or 106 may be equipped to receive signals from an input device. Signals may be received on client devices 102, 104, and/or 106 via Bluetooth, Wi-Fi, infrared, light signals, binary, among other mediums and protocols for transmitting/receiving signals. For example, a user may use a mobile device 102 to check for the media content data from a channel from an OTA antenna (e.g., antenna 104). A graphical user interface may display on the mobile device 102 indicating the media content search results of certain local channels. Specifically, at a particular geolocation, the antenna 104 may receive signals from broadcast tower 122. The antenna 104 may then transmit those signals for analysis via network(s) 108. The results of the analysis may then be displayed on mobile device 102 via network(s) 108. In other examples, the results of the analysis may be displayed on a television device connected to a broadcast module box, such as broadcast module box 106.

In other examples, databases stored on remote servers 116, 118, and 120 may be utilized to assist the system in identifying the user requested media content. Such databases may contain certain media content data such as video titles, actors in movies, video genres, etc. Such data may be transmitted via network(s) 108 to client devices 102, 104, and/or 106 to assist in identifying user requested media content. Because broadcast tower 122 and network(s) 108 are configured to communicate with one another, the systems and methods described herein may be able to identify requested media content in different sources, such as streaming services, local and cloud storage, cable, satellite, or OTA.

Figure 2:
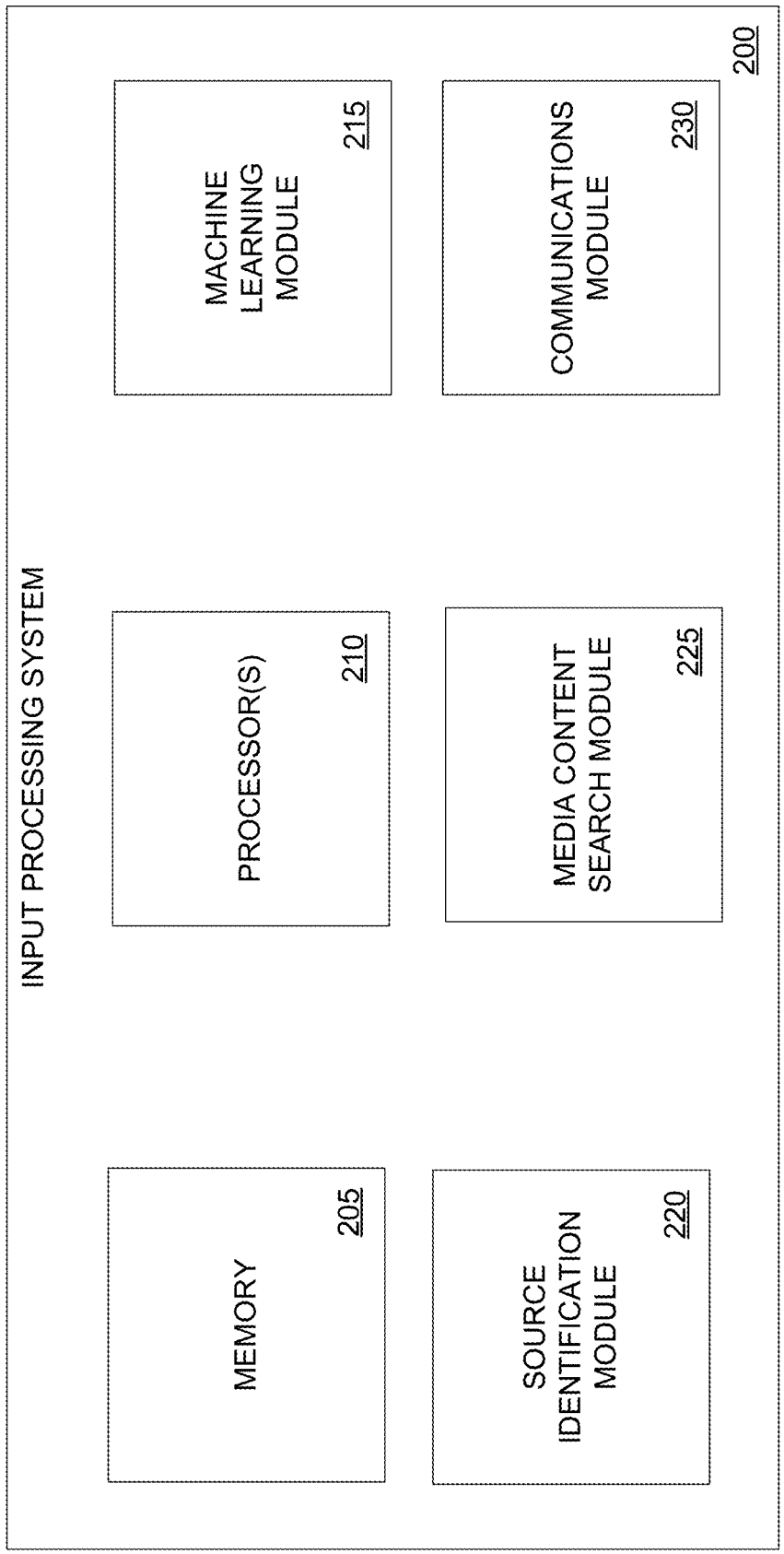
FIG. 2 illustrates an example input processing system for implementing systems and methods for searching for media content across multiple sources.

FIG. 2 illustrates an example input processing system for implementing systems and methods for searching for media content across multiple sources. The input processing system (e.g., one or more data processors) is capable of executing algorithms, software routines, and/or instructions based on processing data provided by a variety of sources related to searching for and identifying user requested media content. The input processing system can be a general-purpose computer or a dedicated, special-purpose computer. According to the embodiments shown in FIG. 2, the disclosed system can include memory 205, one or more processors 210, machine learning module 215, source identification module 220, media content search module 225, and communications module 230. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of machine learning module 215, source identification module 220, media content search module 225, and communications module 230. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205. In some example aspects, memory 205 may store at least one database containing user requested media content information, such as audio or video data.

Machine learning module 215 may be configured to analyze user history of streaming content to determine similar content that the user may request. The machine learning module 215 may be configured to identify similar content based on at least one machine-learning algorithm trained on at least one dataset reflecting a user's multimedia viewing preferences. The at least one machine-learning algorithms (and models) may be stored locally at databases and/or externally at databases (e.g., cloud databases and/or cloud servers). Client devices may be equipped to access these machine learning algorithms and intelligently select particular media content to store for the user based on at least one machine-learning model that is trained on a user's historical viewing history. For example, if a user frequently watches football sporting events, the user's viewing history may be collected to train a machine-learning model to then automatically identify and store football sporting events. In other example aspects, a user may demonstrate a preference for certain sports, movies, genres, actors, time periods, geographies, etc.

As described herein, a machine-learning (ML) model may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In examples, the ML models may be located on the client device, service device, a network appliance (e.g., a firewall, a router, etc.), or some combination thereof. The ML models may process user viewing history and other data stores of user preferences (e.g., social media profiles) to determine which multimedia content should be automatically stored, or, in some examples, suggested to the user for viewing. Determining whether a certain multimedia item should be identified and stored may comprise identifying various characteristics of a user's viewing history and preferences. For instance, if a user has a social media profile that displays several photographs of the user engaging in sports, then the multi-source content system described herein may determine that certain programming from sports channels (e.g., ESPN) should be identified as potential user requested content. Similarly, if a user posts certain social media items reflecting a favorite sports team, the multi-source content system may determine that games in which that specific team is playing should be selected. Based on an aggregation of data from a user's viewing history, social media profiles, and other user data stores, at least one ML model may be trained and subsequently deployed to automatically display and/or suggest for media content that a particular user may enjoy viewing at a later time. The trained ML model may be deployed to one or more devices. As a specific example, an instance of a trained ML model may be deployed to a server device and to a client device. The ML model deployed to a server device may be configured to be used by the client device when, for example, the client device is connected to the Internet. Conversely, the ML model deployed to a client device may be configured to be used by the client device when, for example, the client device is not connected to the Internet. In some instances, a client device may not be connected to the Internet but still configured to receive satellite signals with multimedia information and channel guides. In such examples, the ML model may be locally cached by the client device.

Source identification module 220 is configured identify and connect media content sources to a gateway. The source identification module 220 can aggregate the multiple media content sources and devices connected to the gateway to retrieve media content for any of the sources. Media content search module 225 is configured to query the media content sources and/or user storage sources to identify the user requested media content. The media content search module 225 can prioritize search results according to the various types of content sources. For example, the media content search module 225 prioritized media content stored on local user storage devices over pay-for-view media sources or streaming sources. In other instances, the media content search module 225 may prioritize displaying a requested media content in a higher resolution, although displaying the requested media content in the higher resolution may cost the user more money (e.g., displaying a user-stored media item in 1080p vs. displaying the media item via a paid Internet-streaming service in 4k). In yet further examples, media content search module 225 may be configured to search databases associated with public institutions, such as public libraries. For example, if a user-requested media item is not present in a user storage source or a user-subscribed streaming service, then the media content search module 225 may query a database that houses media items available for rent via a public library. If such media is available at the public library (or other public institution/physical location that has media items available for rent), the media content search module 225 may prompt the user to indicate whether the system should "check-out" the media item on behalf of the user.

Communications module 230 is associated with sending/receiving information (e.g., media content information from machine learning module 215, source identification module 220, and media content search module 225) with a remote server or with one or more client devices, streaming devices, OTA boxes, set-top boxes, etc. . . . These communications can employ any suitable type of technology, such as Bluetooth, WiFi, WiMax, cellular, single hop communication, multi-hop communication, Dedicated Short Range Communications (DSRC), or a proprietary communication protocol. In some embodiments, communications module 230 sends source information identified by the source identification module 220 and information identified by the media content search module 225. Furthermore, communications module 230 may be configured to communicate media content data to a client device and/or OTA box, smart OTA antenna, and/or smart TV, etc. to indicate sources containing the requested media content.

Figure 3:
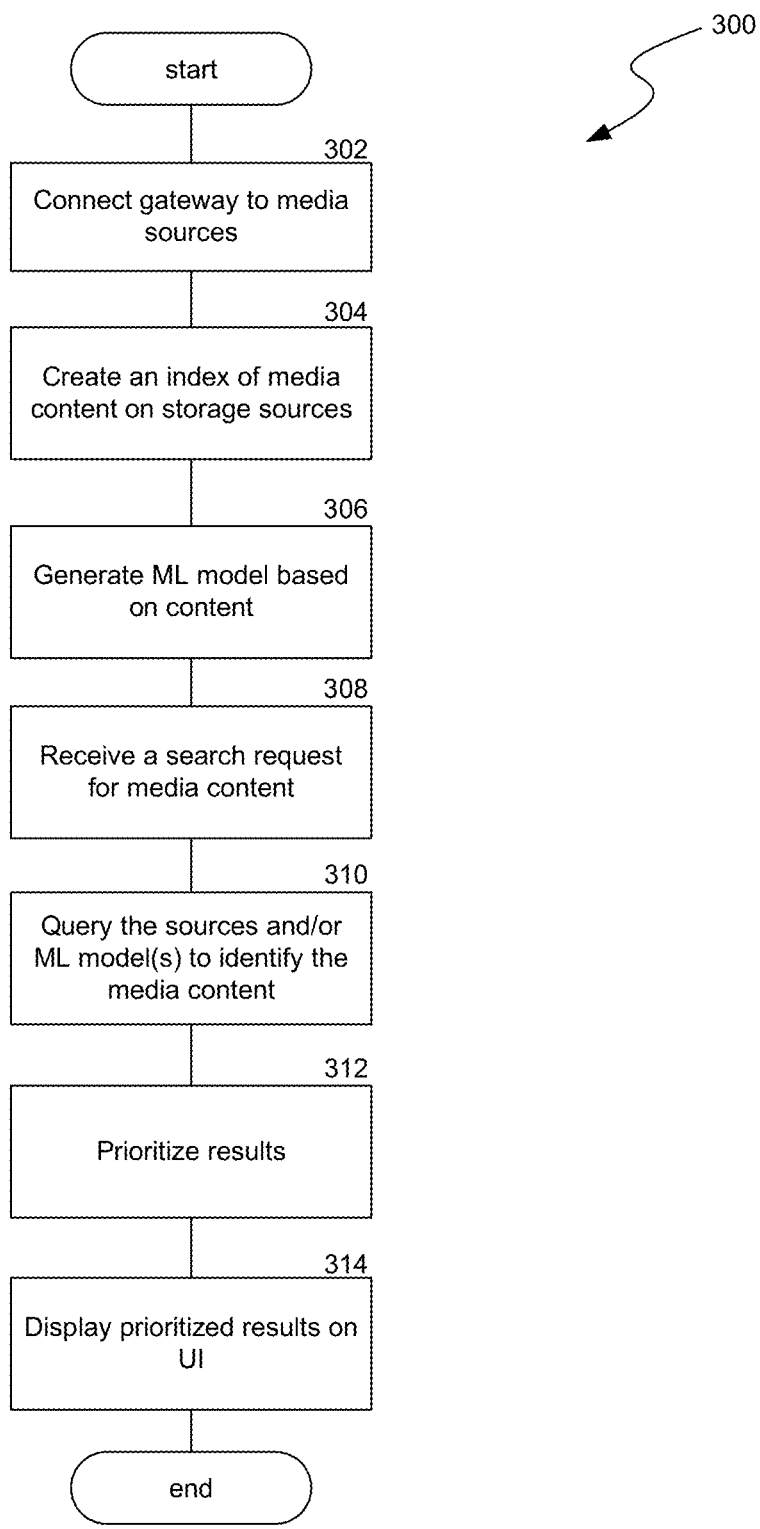
FIG. 3 is a flow diagram illustrating a process used in some implementations for searching for media content across multiple sources.

FIG. 3 is a flow diagram illustrating a process 300 used in some implementations for searching for media content across multiple sources. In some implementations, process 300 is triggered by a user searching for media content (e.g., movie, TV show, song, etc.), a user activating a subscription for multi-source content searching, powering on a device, a device connecting to a gateway (e.g., router), or the user downloading an application on a device for multi-source searching. In various implementations, process 300 is performed locally on the user device or performed by cloud-based device(s) that can support searching for media content in various different media sources (e.g., different media-delivery platforms) to identify user requested media content. When registering for the multi-source content system, the user can provide access information (e.g., passwords, usernames, etc.) to content provider accounts that the multi-source content system can access when searching for requested media content. Process 300 can verify whether the user is authorized to access the multi-source content system by verifying access information.

At block 302, process 300 connects the gateway to user devices and media content sources. The media content sources can include resources available to the user, such as internet streaming content providers (e.g., Hulu™, Netflix™, HBO™, XFinity™, Internet Protocol Video on Demand (IPVOD), public library accounts, etc.), user storage devices (e.g., NAS, hard drives, DVR, cloud storage, etc.), electronic programming guides (EPG) data, interactive programming guide (IPG) data, cable content networks, OTA networks, or satellite networks. Process 300 can aggregate the various media content sources with the gateway as the anchor point in a structure (e.g., user home, business etc.).

Process 300 can analyze the media content stored on or provided by the sources to determine the type of content. For example, process 300 can identify the media content is a sporting event, movie, or TV show. Process 300 can identify metadata of the media content, such as a title, director, or genre of a movie or TV show, actors in the movie or TV show, location of the sporting event, teams participating in the sporting event, etc. At block 304, process 300 creates an index of the media content on the storage sources to facilitate the lookup and retrieval of the media content. In some implementations, process 300 can convert analog content on the storage sources into digital content.

At block 306, process 300 utilizes artificial intelligence (AI) techniques to identify and collect metadata from the media content on storage sources. Specifically, at least one machine-learning model is trained on the index of media content from step 304. For example, process 300 uses AI to identify an actor's facial features and generate metadata identifying the media content, as a movie featuring the actor. Process 300 can perform AI searches (e.g., periodically, continually, or when media content is stored/detected on a device) and generate a cache of the searches. In some implementations, process 300 uses AI to identify historical behavior of user, such as requested media content, and index the media content that the user may request. Additional details on using AI and ML to identify content are described in FIG. 4.

At block 308, process 300 receives a search request for media content from a user. The user can initiate the search request with a voice command or by entering text into a user interface on a device. At block 310, process 300 performs a query of the media content sources for the requested media content. In some embodiments, process 300 searches for the requested content in storage sources before searching in streaming sources. In other embodiments, process 300 searches in all the media content sources simultaneously for the requested content. In other embodiments, process 300 searches for the requested content in sources that are free to the user or that the user has a subscription to before searching in pay-for-view content sources. In some implementations, when the requested media content is not available on a source, process 300 can retrieve machine learning results to select media content similar to requested media content. For example, if the user requests a football game which is not available on any of the sources, process 300 can retrieve a basketball game (which may be relevant to the user) based on at least one trained ML model applied to the user's profile or viewing history. Additional details for ML are described in FIG. 4.

At block 312, process 300 prioritizes the search results when more than one source contains the requested media content. Process 300 can prioritize results from storage sources (i.e., user does not have to stream the media content). In some implementations, process 300 prioritizes media content from the sources based on bandwidth management metrics. In some implementations, process 300 prioritizes media content from the sources based on the cost value to the user. For example, content that is free to the user has a higher priority than content that requires payment by the user. Process 300 can prioritize gateway content sources to the user. In some implementations, process 300 prioritizes media content from the sources based on the relevance (e.g., time/date of an event) to the user. For example, if the user searches for the Superbowl game during the time that the Superbowl is being played, process 300 can prioritize a source which provides a live stream of the Superbowl game. However, if the user searches for the Superbowl months after the Superbowl was played, process 300 can prioritize a source providing highlights, talk shows, or re-runs, over the source which provided a stream of the live game. In another example aspect, process 300 may prioritize the quality of the media content to be displayed to the user. If a media item is available from a user storage source in a lower quality than from an Internet-streaming service in a higher quality, the higher quality media item from the Internet-streaming service may be prioritized over the lower-quality media item from the user storage source even though the lower-quality media item from the user storage source may cost less to the user (or be free) than streaming from an Internet-streaming service.

Figure 6:
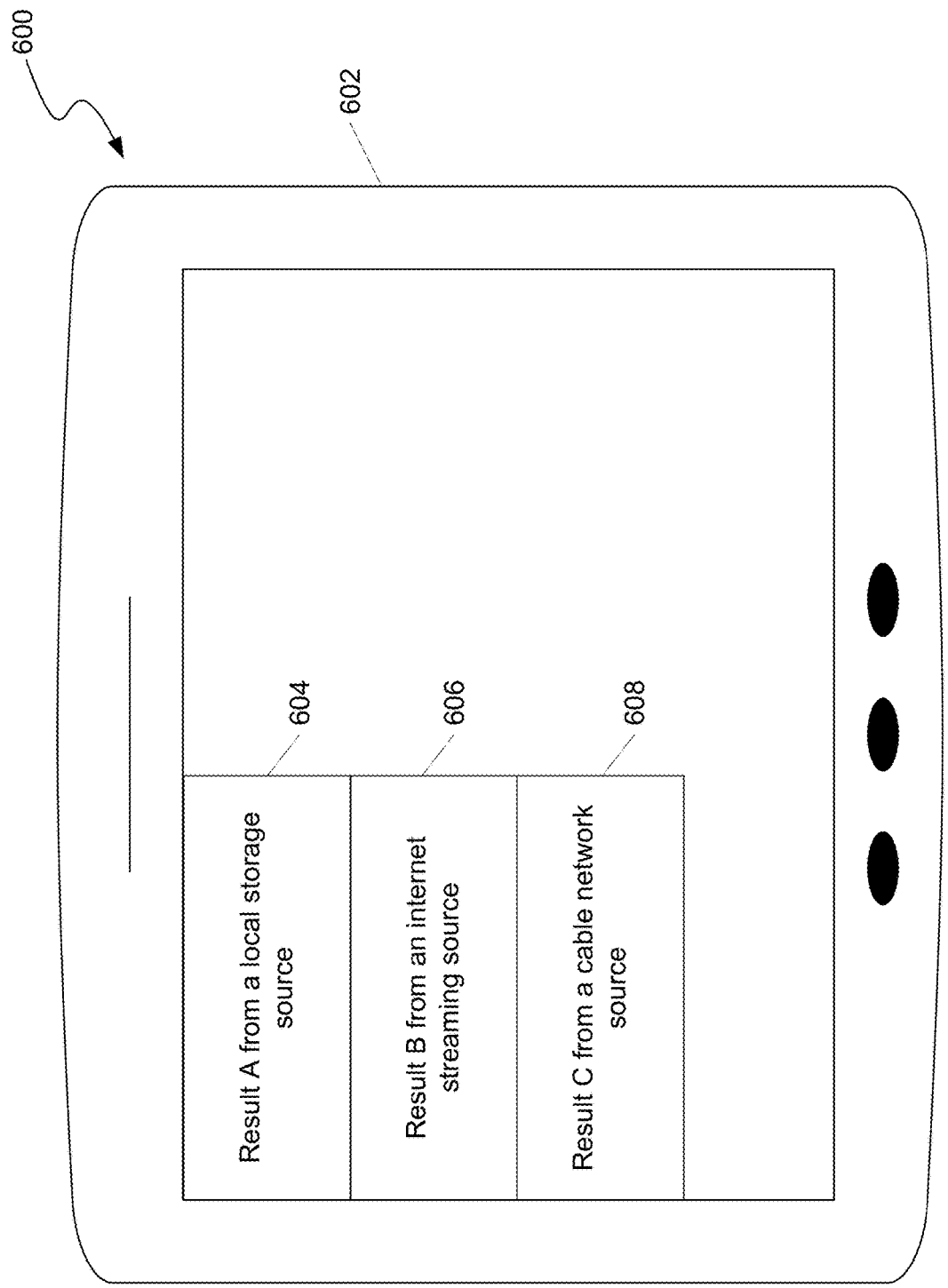
FIG. 6 illustrates an example graphical user interface displaying a user notification.

At block 314, process 300 displays the search results on the user interface according to the prioritized order. For example, as illustrated in example 600 of FIG. 6, notification 604, 606, and 608 are displayed on device 602, notifying the user of the results and the sources providing the results. Example 600 illustrates the prioritized order of the primary result notification 604, the secondary result notification 606, and the tertiary result notification 608. The search results can include a button linked to the content source with the requested content. In some implementations, the results include a notification of when the requested content is available to view. For example, if the user searched for an Olympic event that has not yet occurred, the notification can indicate the time the Olympic event is available and the source providing the Olympic event. The user can receive the search results in a messaging application (e.g., SMS message, instant message, email, etc.) with details identifying the source with the requested media content.

Figure 4:
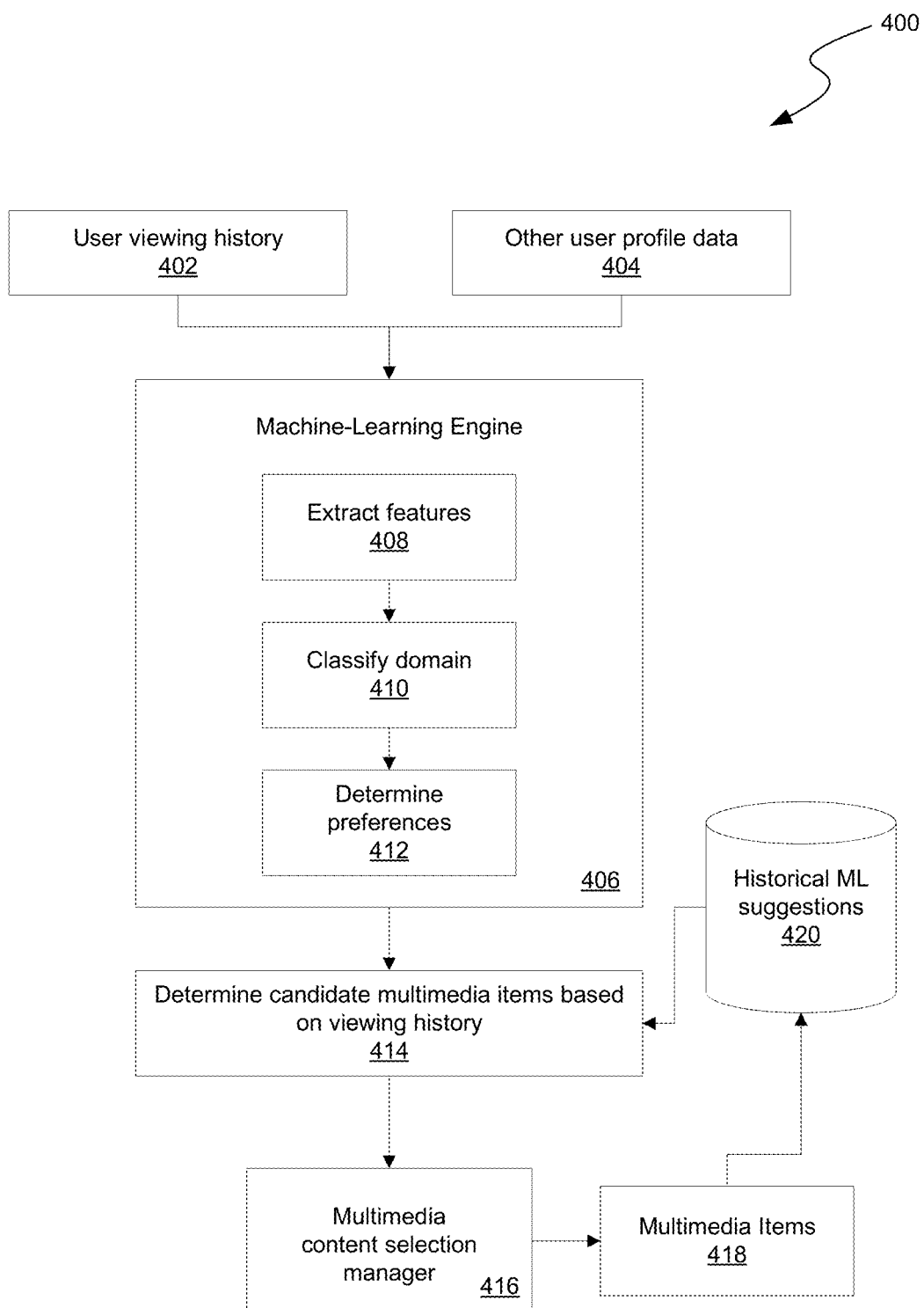
FIG. 4 illustrates an example machine learning system for searching for media content across multiple sources, as described herein.

FIG. 4 illustrates an example machine learning system for searching for media content across multiple sources, as described herein. FIG. 4 begins at operations 402 and 404, where user viewing history 402 and other user profile data 404 are received by the multi-source content system via a device. The data may be received by a client device and/or a remote web server device. In the instance of a remote web server (such as servers 116, 118, and/or 120), the user viewing history and user profile data may initially be collected from a client device and then transmitted via a wireless network (over network(s) 108) to a remote web server device, where the remote web server device receives the user viewing history and user profile data. The received data may be converted into particular representations that may be understood and processed by a machine utilizing machine-learning algorithms (e.g., ML Engine 406) to intelligently disassemble the user viewing history and other user profile data and identify media content (multimedia items) for the user.

The user viewing history 402 and other user profile data 404 may be transmitted to Machine-Learning (ML) Engine 406, where the data may be used to train at least one ML model and/or compared against an already-trained ML model or models. Other user profile data 404 may comprise data from a user's local or cloud storage, user's social media account, user responses to a profile survey, and/or data from other sources. In some aspects, the first operation in ML Engine 406 may be extract features 408. At operation 408, certain features may be extracted from the user viewing history data 402 and other user profile data 404, including but not limited to contextual features and lexical features. For instance, the lexical features that may be analyzed include, but are not limited to, word n-grams that may appear in a social media status update, text messages, emails, and/or other text-based medium hosting user profile data. A word n-gram is a contiguous sequence of n words from a given sequence of text. For instance, a particular social media update earlier in the day from the user may state: "The new Avengers movie was awesome!" The word n-gram that may be extracted in this instance is "Avengers movie was awesome." The intelligent multi-source content system now knows that the user enjoyed a movie with an action genre and particular actors and actresses, and therefore, the system may identify future multimedia items that include similar genres and actors/actresses. As should be appreciated, analyzing word n-grams may allow for a deeper understanding of the user and therefore provide more accurate and intelligent multimedia item selection and suggestions for viewing. The machine-learning algorithms from ML Engine 406 may be able to compare thousands of n-grams, lexical features, and contextual features in a matter of seconds to extract the relevant features of a social media, text, and/or email message. Such rapid comparisons are impossible to employ manually.

The contextual features that may be analyzed at operation 408 may include, but are not limited to, a top context and an average context. A top context may be a context that is determined by comparing the topics and keywords associated with a particular multimedia item and/or text-based input (e.g., social media update, text message, email, search engine inquiry, etc.) to a set of preloaded contextual cues. An average context may be a context that is determined by comparing the topics and keywords of historically processed text-based input data, historical viewing history, the user's level of enjoyment of historically selected multimedia content, user profile data (e.g., scraped from publicly facing social media websites), and other data. The feature extraction operation 408 may also skip contextually insignificant data when analyzing the input data. For example, a string token in a message input may be associated with articles, such as "a" and "an." Because articles are typically insignificant in the English language the feature extraction operation 408 may ignore these article tokens.

In other examples, the user viewing history 402 may comprise video metadata associated with the past-viewed multimedia items. Such metadata may include but is not limited to: director, writer, actors, actresses, date of release, runtime, genre, MPAA film rating, plot summary and storyline, plot keywords, episode number, series information, and critic reviews and ratings, among other data points. ML Engine 406 may be configured to not only process text-based data, but also process image and video data. At operation 408, features that may be extracted from a multimedia item may include but are not limited to faces, settings, and other objects. Objects may be identified at operation 408 by applying an image recognition algorithm stored within ML Engine 406. The image recognition algorithm may be able to identify objects, such as actors and actresses, geographic locations, settings, and points of interest, among other examples. Similarly, ML Engine 406 may be configured to identify objects in images and multimedia files from a user's social media profile and further determine a user's preferences.

Once the features are extracted at operation 408, the domain of the input data (user viewing history 402 and other user profile data 404) may be classified at operation 410. The features that were extracted at operation 408 may be grouped together into specific classifiers for further analysis at operation 410. Specifically, classifying the domain of the extracted features at operation 410 may utilize statistical models or predefined policies (i.e., prior knowledge, historical datasets) to determine the proper domain of classification. For example, if a user previously watched a Hallmark movie associated with a specific holiday, one of the features that may have been extracted at operation 408 was a holiday object (from the movie title, summary, and/or images of the background environment during the movie, etc.) and/or word n-gram describing "Halloween movies." At operation 410, the particular holiday (e.g., "Halloween") may be associated with a broader domain classification such as a "holiday" domain, in which movies with holiday themes generally may be classified.

At operation 412, the preferences of the user may be determined. For example, historical user viewing history may indicate that the user does not frequently watch romantic comedy movies or television shows, so the multi-source content system described herein may assume that the likelihood of a user wanting to watch a Rom-Com is low. Considering the user profile data 404 and the features extracted at operation 408 (e.g., via public social media postings), however, might reveal that the user is currently dating a person that enjoys romantic comedies. Further, the data extracted from the user profile data indicates that the user and the user's partner may have an upcoming "movie night" date scheduled. As such, the immediate preferences of the user to view a romantic comedy may increase, and the multi-source content system may determine that a Rom-Com movie prior to the "movie night" date is likely preferred by the user.

In other examples, a user may indicate that he/she has a favorite sports team. The ML Engine 406 may determine which team that is based on user viewing history 402 and other user profiled data 404. As a result, the multi-source content system may select and create an index of particular games in which the team is playing, but also television shows/documentaries that may be about that particular sports team (e.g., a highlight reel of the sports team on ESPN). It should be appreciated that multiple preferences may be predicted at operation 412. In other examples, the multi-source content system can indicate the type of the content the user is currently viewing. The ML Engine 406 may determine based on user viewing history 402 and other user profiled data 404, media content that is similar to the media content the user is watching. For example, if the user is viewing a football game, the ML Engine 406 may run searches to identify and create an index of other football games to display.

After the features are extracted at operation 408, domains classified at operation 410, and preferences determined at operation 412, the system may determine which candidate multimedia items should be displayed at operation 414. Continuing from the earlier "Halloween" example, a user's viewing history may demonstrate that the user has been frequently watching Halloween-themed multimedia. The possible domain classification for a Halloween-themed movie may be "holiday." As such, other multimedia items that are classified as "holiday" domains may be more relevant to the user. Specifically, if the user enjoyed viewing Halloween-themed Hallmark movies around the time of late October, then the multi-source content system may determine that the user is likely to enjoy Christmas-themed Hallmark movies around the time of December, and the system may preemptively create an index of those movies for the user before the user searches for media content.

Additionally, at operation 414, the multimedia items that are ultimately selected for the cache may be determined using historical selections from the Historical ML suggestions database 420. For instance, certain content that was viewed by the user may be notated in database 420, and content suggestions that were ignored (not viewed) by the user may be notated in database 420, as well. The multimedia items that were viewed and enjoyed by the user may further help determine the candidate multimedia items to be select at step 414.

After candidate multimedia items are selected at operation 414, the method proceeds to multimedia content selection manager 416, where the candidate multimedia items are identified and selected for the cache. For example, multimedia content selection manager may use the steps from FIG. 2 to identify the requested media content. The multimedia content selection manager 416 determines when the candidate multimedia items selected at step 414 will ultimately be displayed.

Once the multimedia item(s) is selected, by the multimedia content selection manager 416, for the cache of multimedia items the user may search for, the multimedia item(s) is cached for user requests at step 418. The selected content is then subsequently stored in Historical ML suggestions database 420 for future reference (e.g., in determining the candidate multimedia items for viewing at step 414). Once a multimedia item is selected and/or displayed, a notification may be provided to the user, requesting feedback of whether the user enjoyed the selection of the multimedia content.

Figure 5:
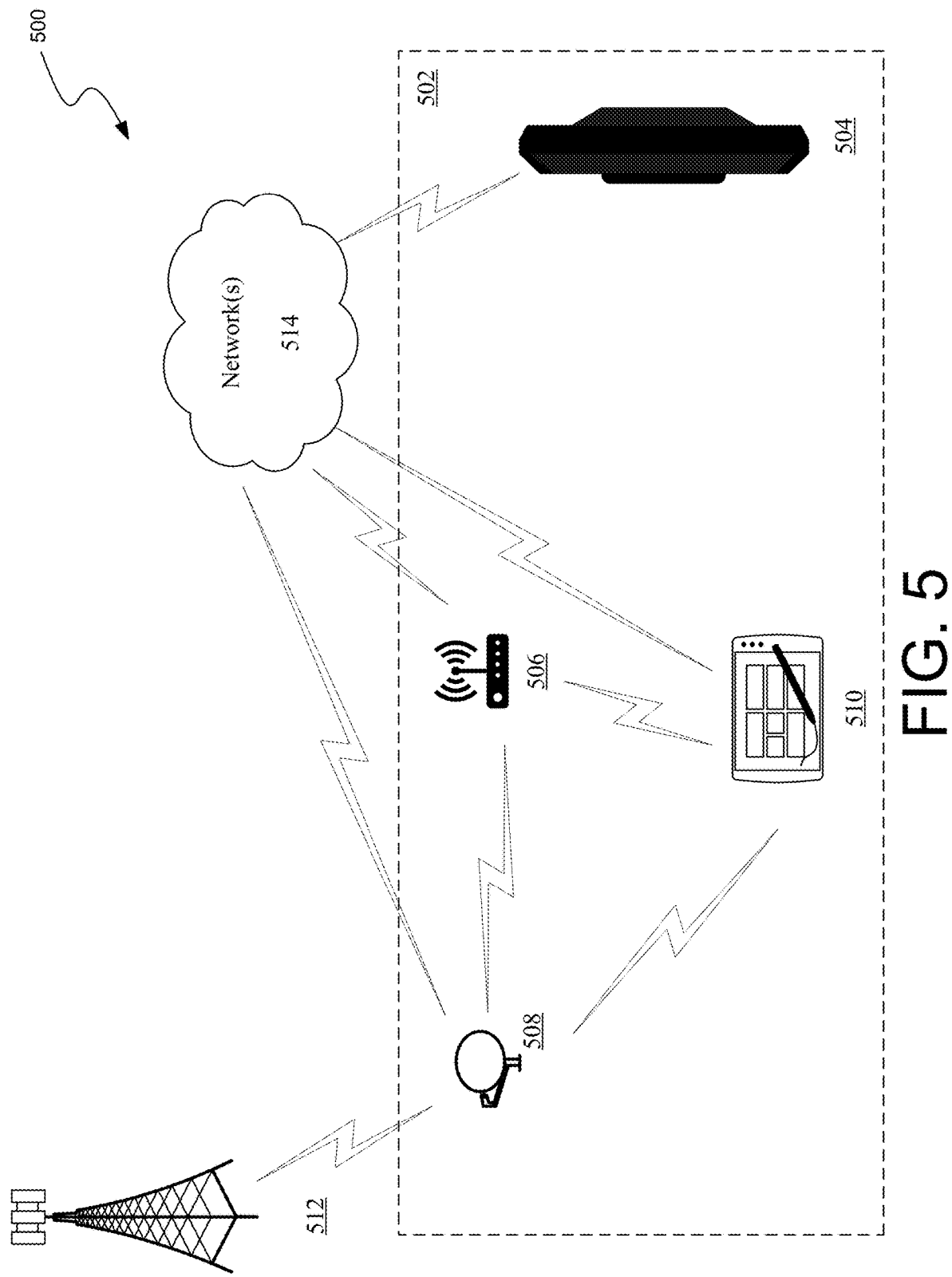
FIG. 5 illustrates an example environment of operation of the disclosed technology.

FIG. 5 illustrates an example environment of operation of the disclosed technology. In the example environment illustrated in FIG. 5, area 502 may represent a house, a commercial building, an apartment, a condo, or any other type of suitable dwelling. Inside area 502 is at least one television 504, an OTA box 506, an OTA antenna 508, and a mobile device 510. Each of these devices may be configured to communicate with network(s) 514. OTA box 506 may be configured as a central gateway communicable with various multimedia content providers and user storage sources, among other servers and databases housing multimedia content available for retrieval and display on user devices. Network(s) 514 may be a WiFi network and/or a cellular network. The OTA antenna 508 may also be configured to receive local broadcast signals from local broadcast tower 512 or satellite broadcast tower. In some examples, when searching multiple media content sources for media content, the system may use local channels and/or programming with channels and programs offered through streaming services (e.g., Internet-streaming, on-demand, etc.) or storage devices. Such media may be delivered via network(s) 514 rather than local broadcast tower 512 and OTA antenna 508. If a certain user-indicated channel and/or program is also offered via an Internet-streaming service, the system may obtain that content via the Internet-streaming service instead of the OTA service.

Figure 7:
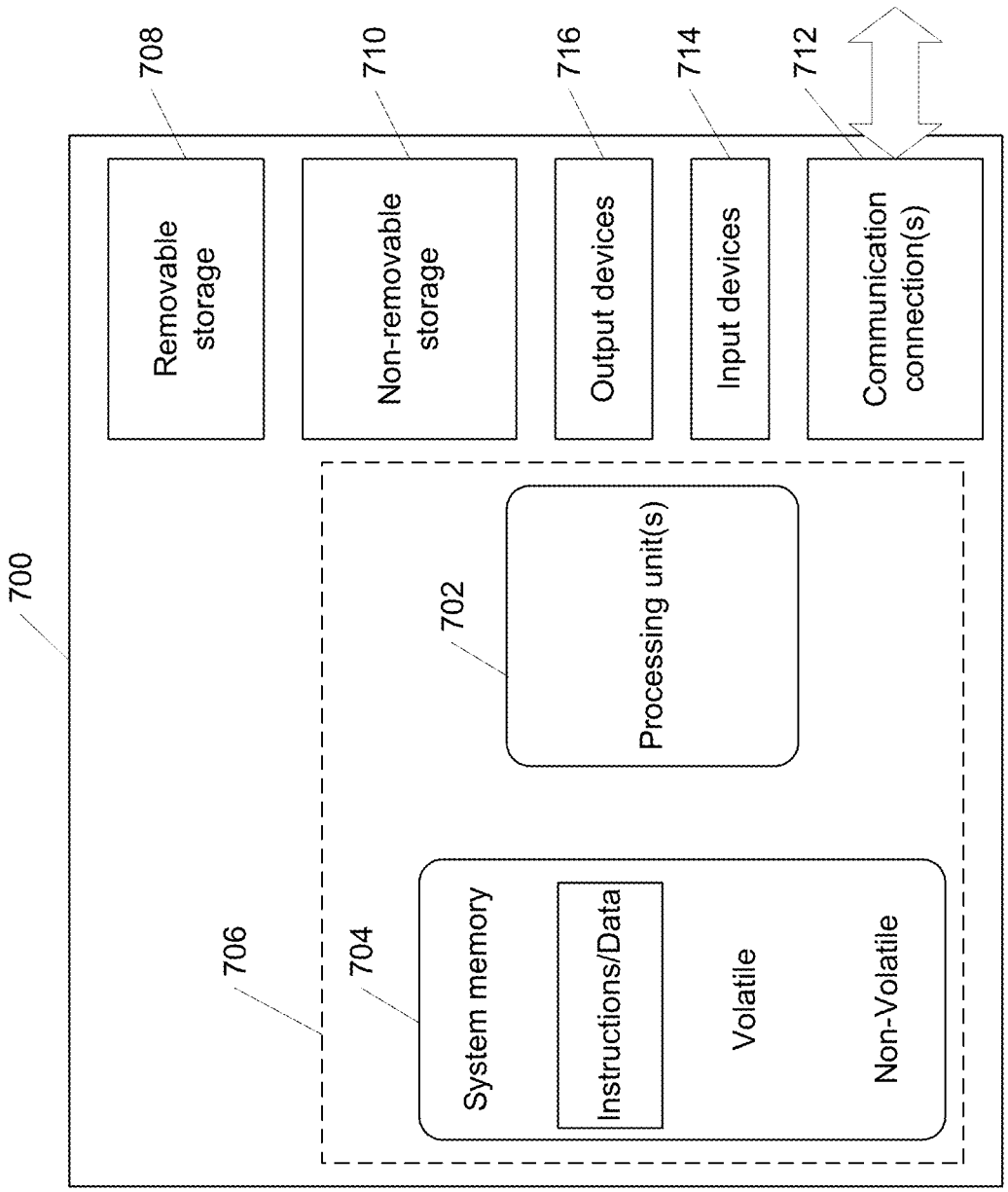
FIG. 7 illustrates one example of a suitable operating environment in which one or more of the present embodiments may be implemented.

FIG. 7 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 700 typically includes at least one processing unit 702 and memory 704. Depending on the exact configuration and type of computing device, memory 704 (storing, among other things, information related to detected devices, compression artifacts, association information, personal gateway settings, and instruction to perform the methods disclosed herein) may be volatile (such as RAM), non-volatile (such as ROM, flash memory, etc.), or some combination of the two. This most basic configuration is illustrated in FIG. 7 by dashed line 706. Further, environment 700 may also include storage devices (removable 708 and/or non-removable 710) including, but not limited to, magnetic or optical disks or tape. Similarly, environment 700 may also have input device(s) 714 such as keyboard, mouse, pen, voice input, etc., and/or output device(s) 716 such as a display, speakers, printer, etc. Also included in the environment may be one or more communication connections, 712, such as Bluetooth, WiFi, WiMax, LAN, WAN, point to point, etc.

Operating environment 700 typically includes at least some form of computer readable media. Computer readable media can be any available media that can be accessed by processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM EEPROM, flash memory or other memory technology, CD-ROM, digital versatile disks (DVD) or other optical storage, magnetic cassettes, magnetic tape, magnetic disk storage, or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulate data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The operating environment 700 may be a single computer (e.g., mobile computer) operating in a networked environment using logical connections to one or more remote computers. The remote computer may be a personal computer, a server, a router, a network PC, a peer device, an OTA antenna, a set-top box, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and the alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A method for accessing multimedia content from a plurality of sources comprising:

querying a first of the plurality of sources for at least one media content item;

in response to a determination that the at least one media content item is not available, identifying at least one other media content item that is similar in content to the at least one media content item available at a second and third of the plurality of sources, wherein identifying the at least one other media content item is based on at least one machine learning model; and upon determination that the at least one other media content item is available at the second and the third of the plurality of sources, selecting one of the second and the third of the plurality of sources to provide the at least one other media content item for display.

2. The method of claim 1, further comprising:
aggregating the plurality of sources at a media gateway.

3. The method of claim 1, further comprising:
indexing the at least one media content item.

4. The method of claim 1, further comprising:
generating a prioritized order of the plurality of sources according to media content items retrieved from the first, the second, and the third of the plurality of sources.

5. The method of claim 1, further comprising:
identifying an Internet-streaming source based on an existence of at least one user subscription to the Internet-streaming source.

6. The method of claim 1, wherein the at least one other media content item is identified by at least one machine-learning algorithm, wherein the at least one machine-learning algorithm is trained based on at least one dataset associated with a past media content item viewing history.

7. The method of claim 1, wherein the at least one other media content source is at least one of: a network attached storage, an Over the Air (OTA) network, a cable network, and a satellite network.

8. A computing system comprising:
one or more processors; and
one or more memories storing instructions that, when executed by the one or more processors, cause the computing system to perform the steps of:
querying a first of the plurality sources for the at least one media content item;
in response to a determination that the at least one media content item is not available at the first of the plurality sources, identifying at least one other media content item that is similar in content to the at least one media content item available at a second and third of the plurality of sources, wherein identifying the at least one other media content item is based on at least one machine learning model; and
upon determining that the at least one other media content item is available at the second and the third of the plurality of sources, selecting one of the second and the third of the plurality of sources to provide the at least one other media content item for display.

9. The computing system of claim 8, wherein the steps further comprise:
aggregating the plurality sources at a media gateway.

10. The computing system of claim 9, wherein the media gateway is communicably coupled to the plurality sources.

11. The computing system of claim 8, further comprising generating a prioritized order of the plurality of sources according to media content items retrieved from the first, the second, and the third of the plurality of sources, wherein the prioritized order is determined based on at least one of: a cost of displaying the at least one media content item and a video quality of the at least one media content item.

12. The computing system of claim 8, wherein the steps further comprise:
identifying an Internet-streaming source based on an existence of at least one user subscription to the Internet-streaming source.

13. The computing system of claim 8, wherein the at least one other media content item is identified by at least one machine-learning algorithm, wherein the at least one machine-learning algorithm is trained based on at least one dataset associated with a past media content item viewing history and wherein the at least one other media content item is different from the at least one media content item.

14. The computing system of claim 13, wherein the at least one other media content item is identified based on a relevance score.

15. A non-transitory machine-readable storage medium having machine executable instructions stored thereon that, when executed by one or more processors, direct the one or more processors to perform a method comprising:
querying a first of the plurality of sources for at least one media content item;
in response to a determination that the at least one media content item is not available, identifying at least one other media content item that is similar in content to the at least one media content item available at a second and third of the plurality of sources, wherein identifying the at least one other media content item is based on at least one machine learning model; and
upon determination that the at least one other media content item is available at the second and the third of the plurality of sources, selecting one of the second and the third of the plurality of sources to provide the at least one other media content item for display.

16. The machine-readable storage medium of claim 15, wherein the method further comprises:
aggregating the plurality of sources at a media gateway.

17. The machine-readable storage medium of claim 16, wherein the method further comprises: indexing a plurality of media content items at the media gateway.

18. The machine-readable storage medium of claim 15, wherein the method further comprises:
generating a prioritized order of the plurality sources according to the plurality of media content items accessible on each of the plurality sources.

19. The machine-readable storage medium of claim 15, wherein selecting the one of the second and the third of the plurality of sources is based on a cost factor.

20. The machine-readable storage medium of claim 15, wherein the at least one machine learning model is trained on at least one database of past media content item viewing history associated with a user.

* * * * *